United States Patent
Hashem et al.

(10) Patent No.: US 6,330,456 B1
(45) Date of Patent: Dec. 11, 2001

(54) SYSTEM AND METHOD TO COMBINE POWER CONTROL COMMANDS DURING SOFT HANDOFF IN DS/CDMA CELLULAR SYSTEMS

(75) Inventors: Bassam Hashem, Nepean; Norman Secord; Wookwon Lee, both of Ottawa, all of (CA)

(73) Assignee: Nortel Networks Limited, St Laurent (CA)

( * ) Notice: Subject to any disclaimer, the term of this patent is extended or adjusted under 35 U.S.C. 154(b) by 0 days.

(21) Appl. No.: 09/849,632

(22) Filed: May 4, 2001

Related U.S. Application Data

(63) Continuation of application No. 09/314,531, filed on May 19, 1999.
(60) Provisional application No. 60/111,954, filed on Dec. 11, 1998.

(51) Int. Cl.[7] .................................................. H04Q 7/20
(52) U.S. Cl. .............................................. 455/522; 455/69
(58) Field of Search .................................. 455/13.4, 517, 455/522, 524, 526, 527, 68, 69, 88, 137, 256; 370/252, 442, 318, 310, 316, 311, 320

(56) References Cited

U.S. PATENT DOCUMENTS

| | | | |
|---|---|---|---|
| 5,412,686 | * 5/1995 | Ling | 375/200 |
| 5,574,747 | * 11/1996 | Lomp | 375/200 |
| 5,603,096 | * 2/1997 | Gilhousen et al. | 455/69 |
| 5,737,327 | * 4/1998 | Ling et al. | 370/335 |
| 5,859,838 | * 1/1999 | Soliman | 370/249 |
| 5,886,987 | * 3/1999 | Yoshida et al. | 370/318 |
| 6,097,972 | * 8/2000 | Saints et al. | 455/572 |
| 6,144,861 | * 11/2000 | Sundelin | 455/522 |
| 6,151,328 | * 11/2000 | Kwon et al. | 370/252 |

* cited by examiner

Primary Examiner—Tracy Legree
Assistant Examiner—Jean A Gelin
(74) Attorney, Agent, or Firm—Dennis R. Haszko; Cobrin & Gittes

(57) ABSTRACT

Mobile stations in communication with several base stations in a cellular CDMA system (as when undergoing soft handoff) do not use the conventional "or of the downs" rule for assessing power control commands from base stations. Mobile stations assess the link quality of the links from the base station. If any base station displays link quality above a predetermined threshold and if that base station is requesting power reduction, power is reduced by a predetermined amount, delta. Otherwise, power is adjusted up or down by an amount less than or equal to delta according to the received power control signals from each base station in conjunction with a weight determined from the signal quality of the link from each base station.

6 Claims, 2 Drawing Sheets

SYSTEM AND METHOD TO COMBINE POWER CONTROL COMMANDS DURING SOFT HANDOFF IN DS/CDMA CELLULAR SYSTEMS

CROSS-REFERENCE TO RELATED PATENT APPLICATIONS

This application is a continuation of U.S. patent application Ser. No. 09/314,531 filed May 19, 1999 which claims benefit to U.S. provisional application Ser. No. 60/111,954, filed Dec. 11, 1998 entitled "System and Method to Combine Power Control Commands During Soft Handoff in DS/CDMA Cellular Systems.

This application is a continuation of U.S. Ser. No. 09/314, 531, dated May 19, 1999, which claims benefit to U.S. provisional application Ser. No. 60/111,954, filed Dec. 11, 1998.

FIELD OF THE INVENTION

The invention relates generally to DS/CDMA radio systems, and particularly to controlling the power output of mobile stations in DS/CDMA radio systems when they are in soft handoff and receiving power control commands from more than one base station.

BACKGROUND OF THE INVENTION

In cellular CDMA systems such as those governed by the IS-95A standard, a plurality of base stations are provided to service mobile users. The coverage areas of the base stations are known as cells. Cells typically overlap. A mobile user with a call in progress may travel toward the edge of a cell, and thus may enter an overlap area between two or more cells.

The base stations monitor the power levels of signals received from mobile stations, and may instruct each mobile station to increase or decrease its power to provide a power level sufficient to sustain communication but low enough to preclude interference with transmissions from other mobile stations.

"Handoff" procedures are known in the art for passing a mobile user from one base station into another. A mobile station is said to undergo "hard handoff" if it disconnects its transmission with the current base station and restarts transmission "from scratch" with a new base station. If the mobile station can communicate simultaneously with two or more base stations involved in the handoff it is said to be in "soft handoff". In this case each of the base stations sends power control commands to the mobile station.

The conventional way for a mobile station to respond to these multiple power control commands is to decrease its power if any of the base stations requests a decrease and to increase its power only if all the base stations so request. This is generally known as the "or of the downs" rule.

In radio transmission, there are various difficulties encountered in maintaining a reliable communication link between a base and a mobile station. One of the frequently encountered difficulties is the time-varying fluctuation of received signal strength, known as fading, due to the nature of the radio transmission environment and the mobility of the mobile station. In fading channels, some of the radio link connections for either forward link (base station to mobile station) or reverse link (mobile station to base station) can be strong while the others can be weak. Furthermore, the multipath fading on the forward and reverse links may differ in their time-varying natures.

To control power on the reverse link, the power control commands are sent uncoded over the forward link to avoid the delay associated with decoding of coded information. Hence, the error rate for these commands is relatively higher than that for the information bits. In conventional DS/CDMA cellular systems, the forward link is designed such that the typical power control bit error rate is around 5% for a connection that would be considered a good connection. This rate can be higher if the received signal strength in the forward link is weaker than the nominal operating signal strength. This error rate can be lower if the power control bits are sent at extra power. Thus, with (i) the conventional combining method of "or of the downs" and (ii) this 5% error rate, the mobile station might erroneously decrease its transmit power even though all the base stations have asked for an increase in power, due to an error in transmission of a single power control command bit.

When the power control commands are erroneously interpreted at the mobile station and the mobile station acts in an opposite direction than desired, its impact on the system capacity can be significant since it might increase interference with signals from other mobile stations. The effective number of mobile stations (or mobile users) served by one base station can be reduced or the quality of service can be degraded. Furthermore, the mobile station can unnecessarily waste its limited battery power in trying to maintain a higher quality signal than required.

Cellular CDMA systems with significant traffic are known to be interference limited. Reducing interference results in an increase in the system capacity. One way to reduce interference is through power control. Power control is used in both the forward link (from base station to mobile) and reverse link (from mobile to base station). Reverse link power control has two parts: open loop and closed loop. The open loop is used to compensate for the effect of distance variations and shadowing which are usually reciprocal on both links (forward and reverse). Since the multipath fading conditions are independent on the forward and the reverse links, the base station has to tell the mobile how to adjust its power to compensate for fading (closed loop).

When the received energy per bit over noise spectral density (Eb/No, a widely used signal-to-noise ratio) from a mobile is higher than a target Eb/No, the base station sends a power control command asking the mobile to decrease its transmitted power, and conversely when the received Eb/No from a mobile is lower than a target Eb/No, the base station requests the mobile to increase its transmitted power. A one-bit command is generally used for this purpose, e.g., a 1 requests decreasing the power while a 0 requests increasing the power by a fixed step $\Delta$.

A large percentage of the time, a mobile can be in soft handoff, typically because of being in the region of overlap between two or more cells. During soft handoff, the mobile signal is received at different base stations and selective combining is performed to pick one of the signals to represent the mobile's signal on a frame-by-frame basis. In such a case, the mobile will be receiving power control commands from different base stations. To reduce the interference, the mobile applies the "or of the downs" rule, application of which is shown in FIG. 1.

The "or of the downs" rule would be the proper scheme if the received power control commands are error-free, since it minimizes the interference. In reality, however, the power control commands can be received in error.

There is thus a need for power control of CDMA mobile stations that is more accurately responsive to power control commands from the base stations when the transmission of power control commands is subject to errors in transmission.

It is thus an object of the present invention to improve Quality of Service (QoS) of the mobile stations.

It is another object of the present invention to provide CDMA mobile stations that respond to accurate power control commands and discriminate against innacurate power control commands from base stations when the power control commands are subject to errors in transmission.

It is another object of the present invention to minimize interference during soft handoff.

It is another object of the present invention to reduce power consumption at a mobile station during soft handoff of the mobile station.

SUMMARY OF THE INVENTION

The present invention overcomes the drawbacks of the prior art and fulfills these and other objectives including minimizing interference during soft handoff, improving system capacity, and reducing power consumption of the mobile station's battery.

In an embodiment of the invention, instead of applying the "or of the downs" rule in a mobile station to respond to multiple power control commands from several participating base stations during soft handoff, the mobile station measures the quality of individual links in terms of received signal-to-interference-plus-noise ratio (SINR) and weights each received power control command in association with its link quality. A determination of power control is made from the weighted commands.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

During soft handoff, a mobile station receives and combines power control signals from all base stations participating in the soft handoff. One or more of these signals can be weak, which will result in a high error probability. Thus, through misinterpretation of weak power control commands, the mobile station can conceivably keep dropping its power even though all base stations are asking for increased power. The strength of the signal depends on the path loss between the base station and the mobile and the number of Rake fingers (in a Rake receiver, known in the art) assigned to the signal. The mobile station has a limited number of fingers to assign to the different signals.

The invention provides a new scheme to combine the power control (PC) commands received in a mobile station during soft handoff. The mobile station measures the SINR received from a base station m participating in the soft handoff process, and based on the measurement assigns a weight ($W_m$) to the corresponding power control command.

The mobile station combines all the power control commands according to a measure of reliability associated with the weights. To reduce the interference, if any base station with a reliable connection asks for a decrease in power the mobile will decrease its power by a predetermined step size $\Delta$. (A connection c is considered reliable if $W_c > \lambda$, where $\lambda$ is a predetermined threshold).

If no reliable signal is received requesting a decrease in power, the mobile adjusts its power by $\gamma$, where $-\Delta \leq \gamma \leq \Delta$. For a practical implementation, $\gamma$ may be chosen from a predetermined set of values.

Figure 1:
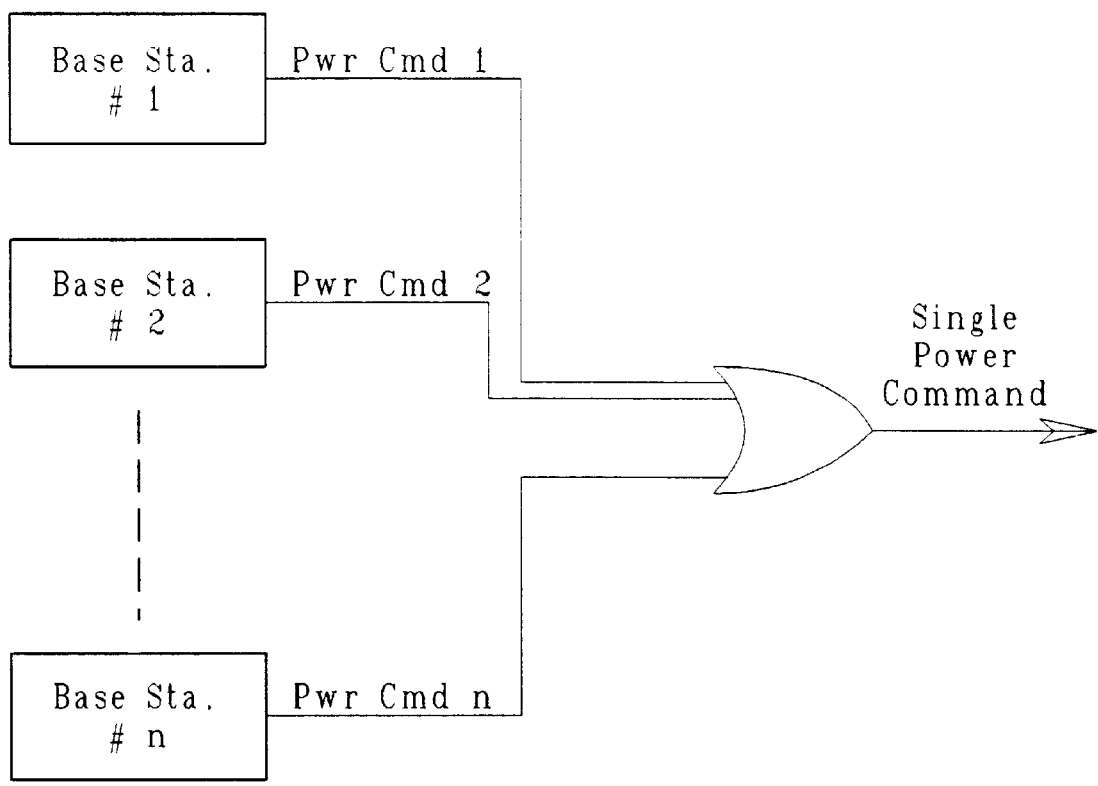
FIG. 1 (prior art) illustrates application of the "or of the downs" rule.
Figure 2:
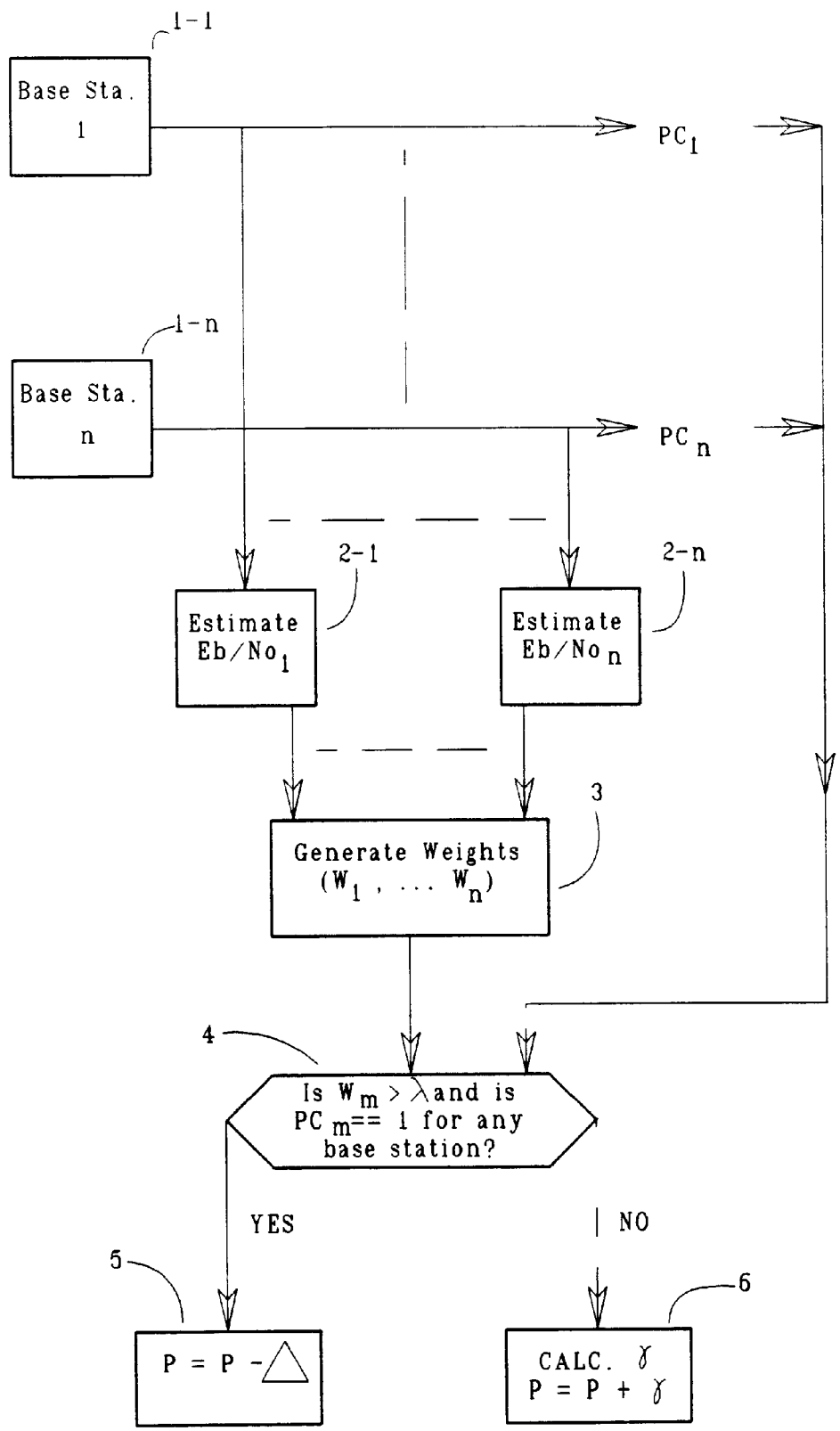
FIG. 2 illustrates the operation of the present invention.

The scheme of the present invention is shown in FIG. 2 in the form of a flow chart which may be implemented in hardware, software, firmware, or a combination thereof.

A mobile station communicating with n base stations receives signals from base stations 1 through n. Included in the signals are Power Control (PC) bits $PC_1$ through $PC_n$, each having a value of 0 to indicate that the corresponding base station is requesting an increase in the mobile station's transmitting power, or a value of 1 to indicate a request for a decrease. However, as noted above, these bits may not have been received correctly. (Those skilled in the art will recognize that in alternative embodiments the opposite bit values could have been employed, or that fields of more than a single bit may be employed.) Signal-to-Noise estimators 2-1 through 2-n estimate quality of transmission $Eb/No_1$ through $Eb/No_n$ for the base stations 1 through n. The quality estimate can be based on any transmitted signal from the base station from which the mobile station is able to accurately measure the channel condition between the base station and the mobile station. Weight calculator 3 determines a weight $W_1$ through $W_n$ for the quality of transmission from each base station according to the Eb/No from each base station.

Decision block 4 determines whether, for any base station, the weight exceeds a predetermined threshold $\lambda$ and if the Power Control bit was received as a 1. If yes (indicating that a base station which is being reliably received requested a decrease in power), power is decreased by a predetermined amount $\Delta$ in block 5.

If decision block 4 does not find any reliable transmission of a request for power decrease, block 6 calculates $\gamma$ (where $-\Delta \leq \gamma \leq \Delta$) as $$\gamma = f(W_1, W_2, \ldots W_n, PC_1, PC_2, \ldots PC_n, \Delta)$$

and alters the transmitting power by $\gamma$. One possible function which has been used to calculate $\gamma$ is as follows:

If $PC_i = 1$ (requesting decrease), $C_i = -1$

If $PC_i = 0$ (requesting increase), $C_i = 1$ $$W_T = W_1 + W_2 + \ldots W_n \qquad \text{[Equation 1]}$$

$$x = W_1/W_T * C_1 + W_2/W_T * C_2 \ldots + W_n/W_T * C_n \qquad \text{[Equation 2]}$$

$$\gamma = x * \Delta \qquad \text{[Equation 3]}$$

In another embodiment of the invention, the $C_n$ bits are given values of +1 if the received PC bit indicates that the power should be increased or −1 if the power should be decreased. A quality indicator $W_1, W_2, \ldots W_n$ is computed for each PC bit. If the magnitude of the quality indicator is greater than a given threshold, the corresponding $C_n$ bit remains unchanged. Otherwise, it is set to zero. This zero will be used to indicate that the power should be left unchanged. The power is decreased by $\Delta$ if any −1 is obtained. If there are no −1's but at least one +1, $\gamma$ is determined as above according to Equations 1, 2, and 3, and the power is increased by γ. If all the $C_n$ bits are set to zero, the power is left unchanged.

In yet another embodiment of the invention, the received signal includes a power control field comprising a number m bits (where m is greater than 1). If the binary value contained in the power control field from a particular base station exceeds a predetermined threshold value, the corresponding $C_n$ bit is set to +1. If the binary value is less than a second threshold value lower than the first, the $C_n$ bit is set to −1. If the binary value falls between the two threshold values, the $C_n$ bit is set to 0. The power is then decreased by Δ if any −1 is obtained. If there are no −1's and at least one +1, γ is calculated as above and the power is increased by γ. If all the $C_n$ values are equal to 0, the power is left unchanged.

It will thus be seen that the invention efficiently attains the objects set forth above among those made apparent from the preceding description. The invention provides improved CDMA radio transmission, minimizes interference during soft handoff, and minimizes power consumption at the mobile station. Those skilled in the art will appreciate that the configuration depicted in FIG. 2 improves the manner in which CDMA mobile stations assess and respond to the power control commands from base stations when the power control commands are subject to the possibility of errors in transmission.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method for combining power control commands received from a plurality of base stations, the method comprising:
   receiving a power control command from one of said base stations;
   assigning a weight to said power control command;
   receiving another power control command from another of said base stations;
   assigning another weight to said another power control command;
   deriving a combined power control command as a function of said assigned weight and said assigned another weight, said combined power control command is also derived as a function of said power control command and said another power control command;
   determining if said weight is greater than a threshold weight;
   wherein said function results in a 1 if:
      said weight is determined to be greater than a threshold weight; and
      said power control command has a value of 0.

2. The method according to claim 1 wherein:
   determining if said weight is greater than a threshold weight; and
   determining if said another weight is greater than said threshold weight;
   wherein said function results in a −1 if:
      said weight is determined to be greater than said threshold weight;
      said another weight is determined to be greater than said threshold weight;
      said power control command has a value of 1; and
      said another power control command has a value of 1.

3. A method for combining power control commands received from a plurality of base stations, the method comprising:
   receiving a power control command from one of said base stations;
   assigning a weight to said power control command;
   receiving another power control command from another of said base stations;
   assigning another weight to said another power control command;
   deriving a combined power control command as a function of said assigned weight and said assigned another weight, said combined power control command is also derived as a function of said power control command and said another power control command;
   determining if said weight is greater than a threshold weight;
   wherein said function results in a −1 if:
      said weight is determined to be greater than a threshold weight; and
      said power control command has a value of 0.

4. A method for combining power control commands received from a plurality of base stations, the method comprising:
   receiving a power control command from one of said base stations;
   assigning a weight to said power control command;
   receiving another power control command from another of said base stations;
   assigning another weight to said another power control command;
   deriving a combined power control command as a function of said assigned weight and said assigned another weight, said combined power control command is also derived as a function of said power control command and said another power control command;
   determining if said weight is greater than a threshold weight; and
   determining if said another weight is greater than a threshold weight;
   wherein said function results in a 1 if:
      said weight is determined to be greater than said threshold weight;
      said another weight is determined to be greater than said threshold weight;
      said power control command has a value of 1; and
      said another power control command has a value of 1.

5. A method for combining power control commands received from a plurality of base stations, the method comprising:
   receiving a power control command from one of said base stations;
   assigning a weight to said power control command;
   receiving another power control command from another of said base stations;
   assigning another weight to said another power control command;

deriving a combined power control command as a function of said assigned weight and said assigned another weight, said combined power control command is also derived as a function of said power control command and said another power control command;

determining if said weight is less than or equal to a threshold weight; and determining if said another weight is less than or equal to said threshold weight;

wherein said function results in a value between 1 and −1 if:
  said weight is determined to be less than or equal to said threshold weight; and
  said another weight is determined to be less than or equal to said threshold weight.

6. A method for combining power control commands received from a plurality of base stations, the method comprising:

receiving a power control command from one of said base stations;

assigning a weight to said power control command;

receiving another power control command from another of said base stations;

assigning another weight to said another power control command;

deriving a combined power control command as a function of said assigned weight and said assigned another weight, said combined power control command is also derived as a function of said power control command and said another power control command;

determining if said weight is less than a threshold weight; and determining if said another weight is less than said threshold weight;

wherein said function results in a value between 1 and −1 if:
  said weight is determined to be less than or equal to said threshold weight; and
  said another weight is determined to be less than or equal to said threshold weight.

* * * * *